(12) United States Patent
Fu et al.

(10) Patent No.: US 10,191,204 B2
(45) Date of Patent: Jan. 29, 2019

(54) MATERIALS AND LIGHTGUIDES FOR COLOR FILTERING IN LIGHTING UNITS

(71) Applicant: GE Lighting Solutions, LLC, East Cleveland, OH (US)

(72) Inventors: Yingchun Fu, Shanghai (CN); Chenjie Xu, Shanghai (CN); Xiaojun Ren, Shanghai (CN); Dengke Cai, East Cleveland, OH (US); Jianmin He, East Cleveland, OH (US); Matthew A. Bugenske, East Cleveland, OH (US)

(73) Assignee: GE Lighting Solutions, LLC, East Cleveland, OH (US)

( * ) Notice: Subject to any disclaimer, the term of this patent is extended or adjusted under 35 U.S.C. 154(b) by 0 days.

(21) Appl. No.: 15/540,575

(22) PCT Filed: Jan. 6, 2015

(86) PCT No.: PCT/CN2015/070191
§ 371 (c)(1),
(2) Date: Jun. 29, 2017

(87) PCT Pub. No.: WO2016/109940
PCT Pub. Date: Jul. 14, 2016

(65) Prior Publication Data
US 2017/0336557 A1 Nov. 23, 2017

(51) Int. Cl.
*F21V 8/00* (2006.01)
*G02B 5/20* (2006.01)
(Continued)

(52) U.S. Cl.
CPC .............. *G02B 6/0065* (2013.01); *F21V 9/00* (2013.01); *G02B 1/04* (2013.01); *G02B 5/206* (2013.01);
(Continued)

(58) Field of Classification Search
CPC .. G02B 6/0041; G02B 6/0091; G02B 6/0095; G02B 6/006; G02B 6/0065; G02B 5/206;
(Continued)

(56) References Cited

U.S. PATENT DOCUMENTS 7,577,318 B2 * 8/2009 Monch ............... C09K 11/7772
359/332
7,695,641 B2 4/2010 Mataki et al.
(Continued)

FOREIGN PATENT DOCUMENTS

CN 102201549 A 9/2011
DE 699 17 065 T2 4/2005
(Continued)

OTHER PUBLICATIONS

Reben, Manuela, et al. "Nd3+-doped oxyfluoride glass ceramics optical fibre with SrF." Optica Applicata 42.2 (2012).*
(Continued)

*Primary Examiner* — Tracie Y Green
(74) *Attorney, Agent, or Firm* — Peter T. DiMauro; GPO Global Patent Operation

(57) ABSTRACT

Materials and lightguides formed thereof that are suitable for use in lighting units to impart a color filtering effect to visible light. At least a portion of such a lightguide (16) is formed of a composite material comprising a polymeric matrix material and an inorganic particulate material that contributes a color filtering effect to visible light passing through the composite material, and the particulate material comprises a neodymium compound containing $Nd^{3+}$ ions.

12 Claims, 4 Drawing Sheets

(51) Int. Cl.
*G02B 1/04* (2006.01)
*F21V 9/00* (2018.01)
*F21Y 103/10* (2016.01)
*F21Y 115/10* (2016.01)

(52) U.S. Cl.
CPC ......... *G02B 6/0015* (2013.01); *G02B 6/0041* (2013.01); *G02B 6/0073* (2013.01); *G02B 6/0091* (2013.01); *F21Y 2103/10* (2016.08); *F21Y 2115/10* (2016.08); *G02B 6/006* (2013.01); *G02B 6/0095* (2013.01)

(58) Field of Classification Search
CPC ...... G02B 1/04; G02B 6/0015; G02B 6/0073; F21V 9/00; F21Y 2115/10; F21Y 2103/10
See application file for complete search history.

(56) References Cited

U.S. PATENT DOCUMENTS

| | | | |
|---|---|---|---|
| 8,349,225 | B2 | 1/2013 | Yue |
| 8,415,410 | B2 | 4/2013 | Nitta |
| 2003/0175004 | A1 | 9/2003 | Garito et al. |
| 2011/0250406 | A1 | 10/2011 | Zia |
| 2012/0057100 | A1 | 3/2012 | Masuda et al. |
| 2012/0113676 | A1* | 5/2012 | Van Dijk ............. G02B 6/0036 362/606 |
| 2012/0155061 | A1 | 6/2012 | Manabe et al. |
| 2014/0192509 | A1 | 7/2014 | Di Trapani et al. |
| 2014/0268794 | A1* | 9/2014 | Donofrio ................. F21V 9/08 362/293 |
| 2015/0252953 | A1* | 9/2015 | Progl ........................ F21K 9/23 362/84 |
| 2016/0097496 | A1* | 4/2016 | Allen .................... F21V 3/0481 257/40 |

FOREIGN PATENT DOCUMENTS

| | | |
|---|---|---|
| EP | 2 135 916 A2 | 12/2009 |
| EP | 2 681 522 A1 | 1/2014 |
| FR | 2 978 448 A1 | 2/2013 |
| WO | 2008/111878 A2 | 9/2008 |

OTHER PUBLICATIONS

Li, M., et al., "Controllable energy transfer in fluorescence upconversion of NdF3 and NaNdF4 nanocrystals," Optic Express, vol. 18, No. 4, pp. 3364-3369 (Feb. 15, 2010).

International Search Report and Written Opinion issued in connection with corresponding PCT Application No. PCT/CN2015/070191 dated Sep. 25, 2015.

European Search Report and Opinion issued in connection with corresponding EP Application No. 15876450.6 dated Jul. 27, 2018.

* cited by examiner

MATERIALS AND LIGHTGUIDES FOR COLOR FILTERING IN LIGHTING UNITS

BACKGROUND OF THE INVENTION

The present invention generally relates to lighting systems and related technologies. More particularly, this invention relates to materials and methods suitable for imparting color filtering effects to light sources, nonlimiting examples of which include edge-lit lighting units comprising a lightguide coupled with a light source (for example, one or more light-emitting diodes (LEDs)) at an edge of the lightguide.

LED lamps (bulbs) are capable of providing a variety of advantages over more traditional incandescent and fluorescent lamps, including but not limited to a longer life expectancy, high energy efficiency, and full brightness without requiring time to warm up. As known in the art, LEDs (which as used herein also encompasses organic LEDs, or OLEDs) are solid-state semiconductor devices that convert electrical energy into electromagnetic radiation that includes visible light. An LED typically comprises a chip (die) of a semiconducting material doped with impurities to create a p-n junction. The LED chip is electrically connected to an anode and cathode, all of which are often mounted within a package. LEDs emit visible light that is more directional in a narrower beam as compared to other light sources such as incandescent and fluorescent lamps. As such, LEDs have traditionally been utilized in applications such as automotive, display, safety/emergency, and directed area lighting. However, advances in LED technology have enabled high-efficiency LED-based lighting systems to find wider use in lighting applications that have traditionally employed other types of lighting sources, including omnidirectional lighting applications previously served by incandescent and fluorescent lamps. As a result, LEDs are increasingly being used for area lighting applications in residential, commercial and municipal settings.

FIGS. 1 and 2 schematically represent a portion of an edge-lit light fixture or luminaire 10 that includes a light source 12 (FIG. 2) disposed in a fixture housing 14. The light source 12 is represented in FIG. 2 as comprising an LED device, which can be one of any number of LEDs in an array within the fixture housing 14, with the LEDs typically facing in the same direction and each LED effectively being a discreet point light source. As such, the fixture housing 14 is configured to point the LED devices 12 in a direction to direct the light emanating from the luminaire 10. As a nonlimiting example, the luminaire 10 can be configured to illuminate the shelving and contents of a commercial refrigerated display case. Another type of edge-lit luminaire is referred to as a recessed troffer, which is commonly used for drop ceilings in commercial and retail space. Still other applications for edge-lit luminaires include signage, an example of which is "exit" signs commonly used in commercial and retail space.

For illumination applications of the types noted above, the luminaire 10 is shown as further comprising a lightguide 16 having an edge 18 (FIG. 2) disposed in proximity to the array of LED devices 12. As known in the art, the lightguide 16 is an optic component commonly employed in edge-lit technologies. Lightguides are formed to have a surface microstructure adapted to achieve total internal reflection (TIR) to direct light from a light source to a desired application space. The lightguide 16 may be visible from multiple directions, and is typically desired to have a uniform luminance while illuminating a specified area with a desired light level. Depending on the particular application, materials commonly employed to produce lightguides include optical grade transparent materials such as acrylics, though various other materials may be used, for example, polyamides (nylon), polycarbonate (PC), polystyrene (PS), and polypropylene (PP).

Because LED devices emit visible light in narrow bands of wavelengths, for example, green, blue, red, etc., combinations of different LED devices are often combined in LED-based lamps to produce various light colors, including white light. The LED devices are often mounted on a carrier, and may be encapsulated on the carrier, for example, with a protective cover, often formed of an index-matching material to enhance the efficiency of visible light extraction from the LED devices. As a nonlimiting example, FIG. 2 represents the LED device 12 mounted on a carrier 20 and enclosed by a dome 22 that serves as an optically transparent or translucent envelope enclosing an LED chip (not shown) on the carrier 20. A phosphor may also be used to emit light of color other than what is generated by an LED. For this purpose, the inner surface of the dome 22 may be provided with a coating that contains a phosphor composition, in which case electromagnetic radiation (for example, blue visible light, ultraviolet (UV) radiation, or near-visible ultraviolet (NUV) radiation) emitted by the LED chip can be absorbed by the phosphor composition, resulting in excitation of the phosphor composition to produce visible light that is emitted through the dome 22. As an alternative, the LED chip may be encapsulated on the carrier 20 with a coating, and such a coating may optionally contain a phosphor composition for embodiments in which LED-phosphor integration with LED epitaxial (epi) wafer or die fabrication is desired.

Though the use of combinations of different LED devices and/or phosphors can be utilized to promote the ability of luminaires equipped with lightguides to produce desired lighting effects, certain desirable lighting effects can be somewhat challenging to achieve with such approaches. A notable example is the lighting effect achieved with the REVEAL line of incandescent bulbs commercially available from GE Lighting, which are produced to have an outer jacket formed of a glass doped with neodymium oxide (neodymia, $Nd_2O_3$) to filter certain wavelengths of light. Lighting effects similar to that achieved with the REVEAL line of incandescent bulbs would also be desirable for luminaires equipped with lightguides.

BRIEF DESCRIPTION OF THE INVENTION

The present invention provides materials and lightguides formed thereof that are suitable for use in lighting units to impart color filtering effects to light sources, and particularly edge-lit lighting units comprising lightguides coupled with LED-based light sources.

According to one aspect of the invention, at least a portion of a lightguide is formed of a composite material comprising a polymeric matrix material and an inorganic particulate material that contributes a color filtering effect to visible light passing through the composite material, and the particulate material comprises a neodymium compound containing $Nd^{3+}$ ions.

According to another aspect of the invention, a lighting unit includes a light source that emits visible light and a lightguide configured and arranged so that at least a portion of the visible light of the light source passes therethrough. The portion of the lightguide is formed of a composite material comprising a polymeric matrix material and an inorganic particulate material that contributes a color filtering effect to the visible light passing through the portion, and the particulate material comprises a neodymium compound containing $Nd^{3+}$ ions.

Additional aspects of the invention include utilization of a composite material of a type described above, wherein the neodymium compound can be present as discrete particles or as a dopant in the particulate material to promote refractive index matching of the particulate material and the polymeric matrix material sufficient to impart a low-haze optical effect to visible light emitted by the lighting unit, believed to be due at least in part to minimizing Mie scattering.

Technical effects of the composite materials, lightguides, and lighting units described above preferably include the capability of providing a desirable color filtering effect, and preferably with the capability of matching the refractive index of the matrix material to minimize optical scattering of light passing through the composite materials and lightguides.

Other aspects and advantages of this invention will be better appreciated from the following detailed description.

DETAILED DESCRIPTION OF THE INVENTION

Figure 1:
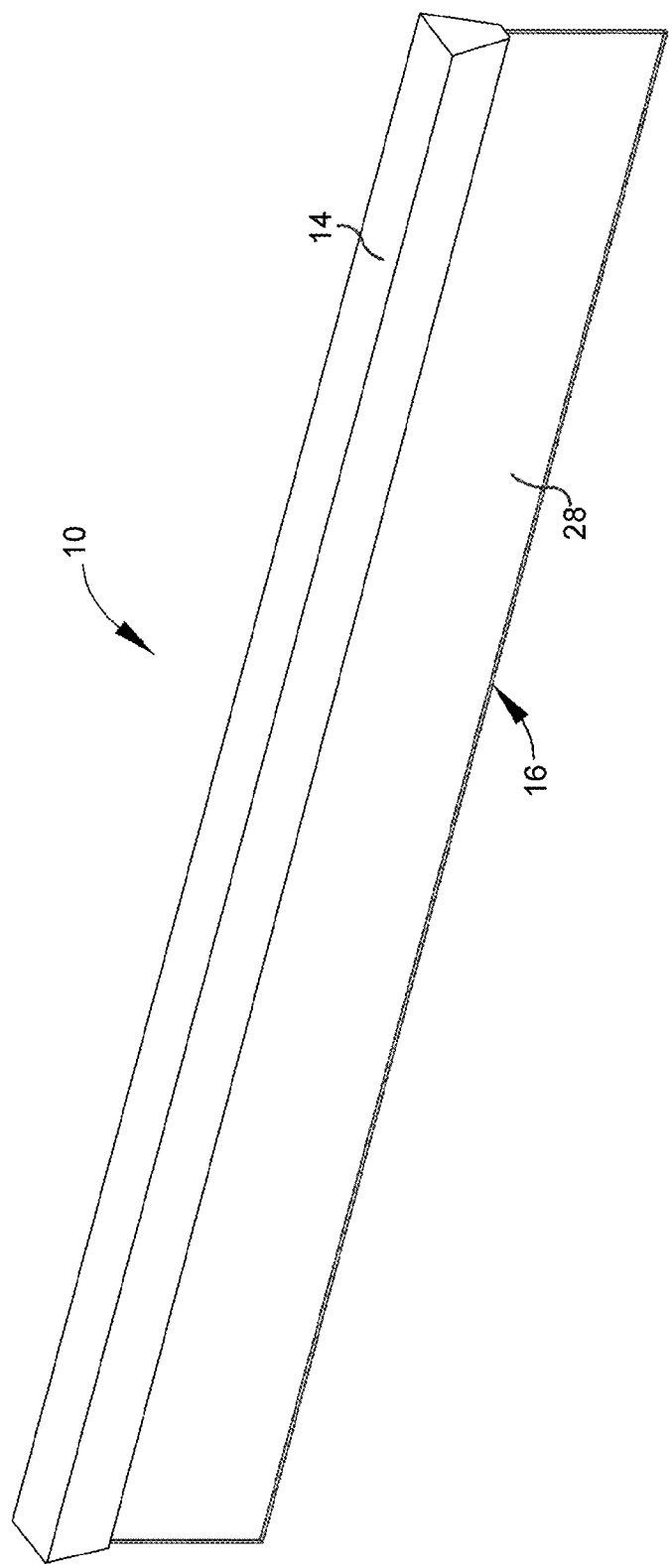
FIG. 1 schematically represents a perspective view of an edge-lit luminaire of a type capable of benefitting from the inclusion of a lightguide containing a neodymium-fluoride composition in accordance with a nonlimiting embodiment of this invention.
Figure 2:
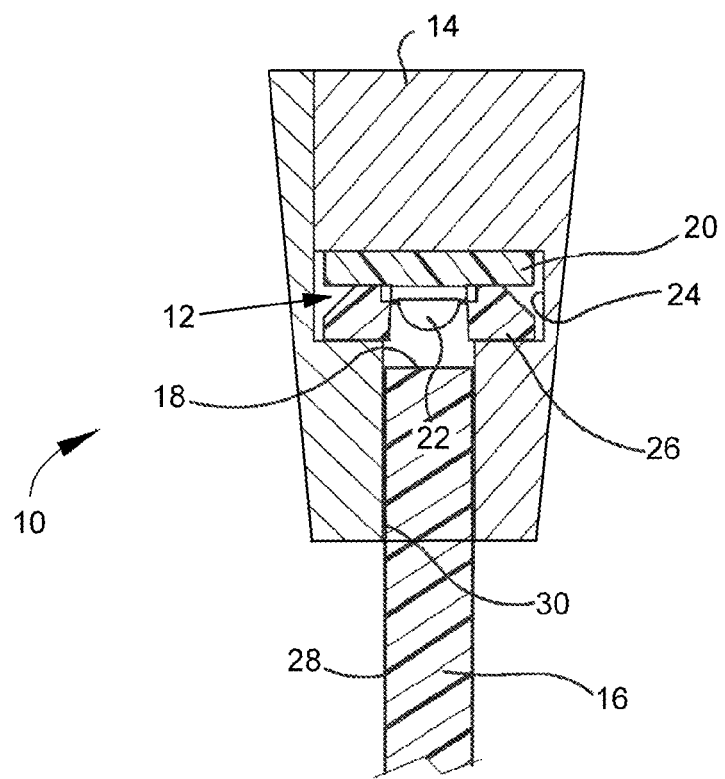
FIG. 2 schematically represents a partial cross-sectional view of the edge-lit luminaire of FIG. 1.

The following discussion will make reference to the LED-based luminaire 10 represented in FIGS. 1 and 2. However, it should be appreciated that lighting units and LED devices of various other configurations are also within the scope of the invention.

As previously discussed, the luminaire 10 represented in FIGS. 1 and 2 includes an array of LED devices 12, one of which is schematically depicted in FIG. 2. The LED devices 12 serve as the light source or light engine of the edge-lit luminaire 10. Any number of LED devices 12 can be utilized with the luminaire 10, with the number and spacing therebetween depending on the desired amount of light output and the distribution of light desired. The luminaire 10 may be one of a plurality of luminaires arranged and potentially assembled together to provide a fixture with a desired light output level.

As previously discussed in reference to FIG. 2, each LED device 12 can be enclosed by a dome 22 and mounted on a carrier 20 located in a cavity 24 within the fixture housing 14. An edge portion of the lightguide 16 is received through an opening 30 in the housing 14 and secured within the opening 30 so that the lightguide edge 18 is located in proximity to, though typically spaced apart from, the LED devices 12. The housing 14 is represented as containing optics 26, for example, reflectors and/or lenses, for directing light from the LED devices 12 toward the edge 18 of the lightguide 16. Various constraints known in the art exist for the type, size, shape, and placement of the optics 26 relative to the LED devices 12 and the lightguide edge 18, for example, to promote optical efficiency by maximizing coupling of the lightguide 16 with light emitted from the LED devices 12, and such constraints will not be discussed in any detail here.

The housing 14 can have any suitable shape, and is therefore not limited to the cross-sectional shape represented in FIGS. 1 and 2. The housing 14 will typically be equipped with various other features and hardware necessary for its intended use. For example, the housing 14 may include a heat sink (not shown) for conducting heat away from the LED devices 12, various features and hardware for mounting the luminaire 10 to a support surface, electrical wiring for connecting the LED devices 12 to a power source, etc.

As known in the art, the lightguide 16 preferably serves to trap light received at its edge 18 through total internal reflection (TIR), and redirect the trapped light out of the lightguide 16 as a result of the presence of defects or other light-extracting features located at surfaces 28 of the lightguide 16, preferably limited to surface regions outside the housing 14 to inhibit losses from the edge portion of the lightguide 16 within the housing 14. As known in the art, the light-extracting features extract light from the lightguide 16 that would otherwise be trapped within the lightguide 16 due to total internal reflection. Various approaches and aspects are known in the art as to the creation and configuration of light-extracting features for use in lightguides, and will not be discussed in any detail here.

The lightguide 16 is represented in FIGS. 1 and 2 as having a blade configuration characterized a rectangular cuboid or parallelepiped shape, though other three-dimensional shapes are also within the scope of the invention. The width of the edge 18 exposed to the light within the housing 14 can also vary, with widths of about four millimeters being a known example. Though the surfaces 28 of the lightguide 16 are represented as being planar and entirely free of any features (other than light-extracting features), the surfaces 28 may be modified to achieve certain illumination effects desired of the luminaire 10, for example, features that enable the luminaire 10 to function as signage, such as modifying certain light-extracting features or applying a film to the surfaces 28 to define, for example, letters, symbols, or graphics.

The present invention provides composite materials suitable for use as lightguides (including the lightguide 16 of FIGS. 1 and 2) and capable of imparting a color filtering effect to visible light emitted by a lightguide, particularly visible light generated by one or more LED devices. The composite materials contain a source of $Nd^{3+}$ ions, which through investigations leading to the present invention has been determined to be effective for providing a color filtering effect, in particular to filter visible light in the yellow light wavelength range, for example, wavelengths of about 0.56 to about 0.60 micrometers.

According to certain aspects of the invention, such composite materials and lightguides produced therefrom may have little if any optical scattering (diffusion) effect, depending on the composition of the composite material. As examples, preferred composite materials comprise an optical grade transparent material as a polymeric matrix material, in which is dispersed an inorganic particulate material containing the source of $Nd^{3+}$ ions. The $Nd^{3+}$ ion source may be a neodymium compound present as a dopant in the particulate material, or as discrete particles that may be optionally combined with discrete particles of other materials to make up the particulate material. A particulate material containing discrete particles of the neodymium compound (e.g., formed partially or entirely of the neodymium compound) and/or discrete particles doped with the neodymium compound can be combined with a polymeric matrix material for the purpose of promoting refractive index matching of the particulate and polymeric matrix materials (i.e., minimize the difference in their refractive indices) sufficient to impart a low-haze (low-diffusivity) optical effect to visible light passing through the composite material.

A preferred source for the $Nd^{3+}$ ions is believed to be Nd—F containing materials having a relatively low refractive index. A particularly preferred $Nd^{3+}$ ion source is believed to be neodymium fluoride, $NdF_3$, which has a refractive index of around 1.6, providing a suitably low refractive index for index matching with certain polymeric matrix materials to minimize scattering losses. Other $Nd^{3+}$ ion sources are possible, for example, other compounds containing Nd—F, nonlimiting examples of which include Nd—X—F compounds where X is at least one element that forms a compound with neodymium, as examples, oxygen, nitrogen, sulfur, chlorine, etc., or at least one element (other than Nd) that forms a compound with fluorine, as examples, metals such as Na, K, Al, Mg, Li, Ca, Sr, Ba, and Y, or combinations of such elements. Particular examples of Nd—X—F compounds include neodymium oxyfluoride (Nd—O—F) compounds formed of Nd—F (including $NdF_3$) and Nd—O compounds (including $Nd_2O_3$), Nd—X—F compounds in which X may be Mg and Ca or may be Mg, Ca and O, as well as other compounds containing Nd—F, including perovskite structures doped with neodymium. Certain Nd—X—F compounds may advantageously enable broader absorption at wavelengths of about 580 nm. For example, depending on the relative amounts of Nd—O and Nd—F compounds, an oxyfluoride compound may have a refractive index that is between that of the Nd—O compound (for example, 1.8 for neodymia) and Nd—F compound (for example, 1.60 for $NdF_3$). Nonlimiting examples of perovskite structure materials doped with neodymium include those containing at least one constituent having a lower refractive index than the neodymium compound (e.g., $NdF_3$), for example, metal fluorides of Na, K, Al, Mg, Li, Ca, Sr, Ba, and Y. Such host compounds have lower refractive indices than $NdF_3$ in the visible light region, nonlimiting examples of which include NaF (n=1.32), KF (n=1.36), $AlF_3$ (n=1.36), $MgF_2$ (n=1.38), LiF (n=1.39), $CaF_2$ (n=1.44), $SrF_2$ (n=1.44), $BaF_2$ (n=1.48), and $YF_3$ (n=1.50) at a wavelength of 589 nm. As a result of doping with a high refractive index Nd—F compound, for example, $NdF_3$, the resulting doped perovskite structure compound has a refractive index that is between that of the host (for example, 1.38 for $MgF_2$) and $NdF_3$ (1.60). The refractive index of the $NdF_3$-doped metal fluoride compound will depend on the ratio of Nd ions and metal ions.

Generally, a low-haze (low-diffusivity) optical effect due to a minimal level of optical scattering is said to be achieved herein if the refractive indices of the matrix and particulate materials are within 0.1 of each other in the visible light region. If $NdF_3$ is used as the sole inorganic particulate material in a lightguide whose polymeric matrix material is a polycarbonate (PC) or polystyrene (PS), the refractive indices of $NdF_3$ (about 1.60) and PC and PS (about 1.586) are such that a minimal level of optical scattering occurs when light passes through the component. Another example of a polymer having a refractive index within 0.1 of $NdF_3$ is a fluorine-doped polyester (refractive index of about 1.607). In this regard, the polymeric matrix material is chosen on the basis of having a refractive index that is similar to the neodymium compound so as to achieve a low-haze (low-diffusivity) optical effect.

Refractive index matching with other polymers having refractive indices that differ from the neodymium compound in the visible light region by more than 0.1 can be achieved with modifications to the particulate material. For example, the source of $Nd^{3+}$ ions (e.g., $NdF_3$) can be used in combination with one or more other materials to yield an effective refractive index that achieves a minimal level of optical scattering in a lightguide whose polymeric matrix material has a refractive index that differs from the $Nd^{3+}$ ion source by more than 0.1 in the visible light region, for example, acrylics (for example, polymethyl methacrylate; PMMA), polyvinylidene fluoride (PVDF), and silicones. As a non-limiting example, particles formed of a metal fluoride and/or a metal oxide can be doped with the neodymium compound to have a refractive index between that of the neodymium compound and the metal fluoride and/or metal oxide. Non-limiting examples of suitable metal fluorides and metal oxides include NaF (refractive index of about 1.32) and $MgF_2$ (refractive index of about 1.38). By selecting an appropriate co-solidation ratio of the neodymium compound and the metal fluoride and/or metal oxide, the refractive index of the particulate material can be tailored to allow for matching or near matching with the refractive index of PMMA (about 1.49), polyvinylidene fluoride (about 1.42), or a methyl-type silicone (about 1.41), which are often utilized in LED packages.

Figure 3:
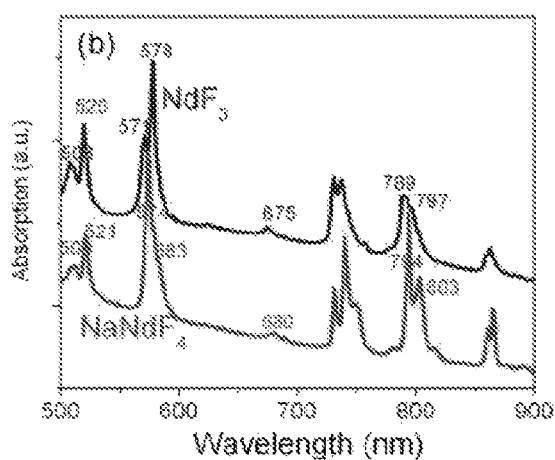
FIG. 3 is a graph representing the absorption spectra observed for $NdF_3$ and $NaNdF_4$ nanocrystals.
Figure 4:
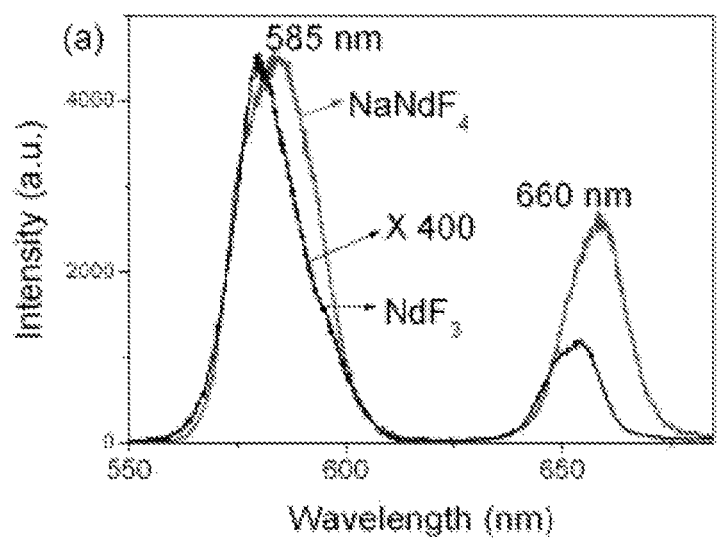
FIG. 4 is a graph representing the upconversion fluorescence spectra for $NdF_3$ and $NaNdF_4$ nanocrystals when subjected to an excitation frequency ($\lambda_{exc}$) of 800 nm and an excitation power of 240 mW.

FIGS. 3 and 4 are graphs published in "Controllable Energy Transfer in Fluorescence Upconversion of $NdF_3$ and $NaNdF_4$ Nanocrystals", Li et al., Optics Express, Vol. 18 Issue 4, pp. 3364-3369 (2010), and represent optical properties for $NdF_3$ and $NaNdF_4$ nanocrystals dispersed in water at the same molar concentration. FIG. 3 represents the absorption spectra observed for the $NdF_3$ and $NaNdF_4$ nanocrystals, and FIG. 4 represents the upconversion fluorescence spectra for the $NdF_3$ and $NaNdF_4$ nanocrystals when subjected to an excitation frequency ($\lambda_{exc}$) of 800 nm and an excitation power of 240 mW. As evident from FIG. 3, the absorption peaks of $NdF_3$ and $NaNdF_4$ were 578 and 583, respectively, and therefore well within the yellow light wavelength range (about 560 to about 600 nm), and FIG. 4 evidences that the absorption peaks of $NaNdF_4$ were slightly shifted relative to those of $NdF_3$. FIGS. 3 and 4 indicate that co-solidation of $NdF_3$ and NaF (to yield $NaNdF_4$) did not fundamentally change the absorption characteristics of $NdF_3$. As such, it is believed that a desirable color filtering effect can be achieved with composite materials containing particles containing a compound other than Nd—F that has been doped with an Nd—F compound to yield an Nd-M-F compound (where M is a metal other than neodymium).

Figure 5:
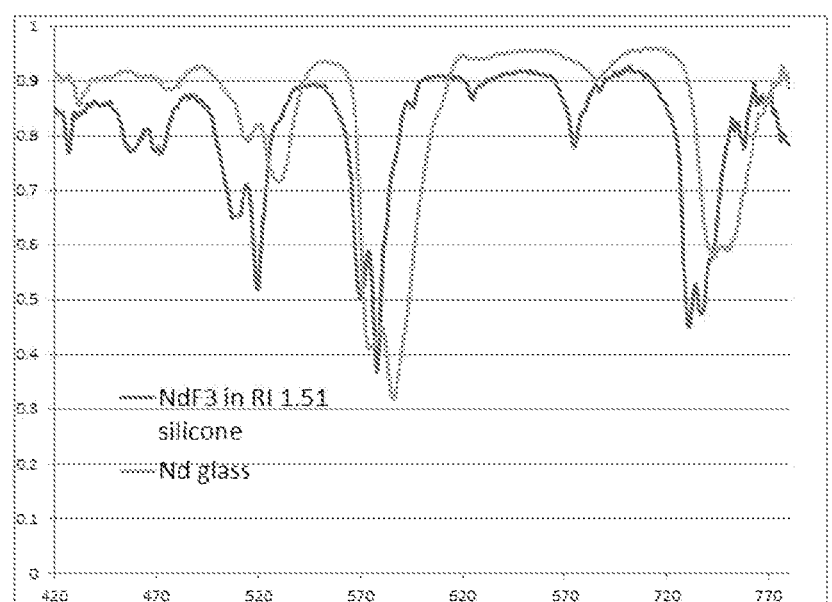
FIG. 5 is a graph representing optical transmission characteristics of $NdF_3$ dispersed in a silicone matrix, in comparison to that of an $Nd_2O_3$-doped glass.

The color filtering effect resulting from visible light absorption provided by $Nd^{3+}$ ions in the visible light spectrum is believed to be superior to Nd—O compounds (such as $Nd_2O_3$) with respect to yellow light wavelengths within the range of 0.56 to about 0.60 micrometers. Nd—F and Nd—X—F compounds have a further advantage over Nd—O compounds by having a refractive index much closer to various standard optical grade transparent plastics, for example, PC, PS, PMMA, PVDF, silicone, and polyethylene terephthalate (PET), and can better balance optical losses from scattering attributable to refractive index mismatch and Nd ion absorption. By filtering yellow light wavelengths, light emitted by an array of white LED devices can be adjusted to achieve an enhanced color effect by separating green and red light through filtering yellow light wavelengths, such as by increasing LED white light CRI (color rendering index), CSI (color saturation index) and enabling color points closer to the white locus. A notable example of such a desirable lighting effect is achieved with the REVEAL line of incandescent bulbs commercially available from GE Lighting, which are produced to have an outer jacket formed of a glass doped with neodymia ($Nd_2O_3$) to filter certain wavelengths of light. FIG. 5 is a graph representing the optical transmission of $NdF_3$ dispersed in a silicone matrix in comparison to that of an $Nd_2O_3$-doped glass, and evidences the similarities in their optical transmissions, particularly in terms of their abilities to filter yellow light wavelengths.

The volumetric amount and particle size of the particulate source of $Nd^{3+}$ ions in a composite material is believed to have an influence on the color filtering effect of the composite material. In addition, the relative amounts and particle size of any second material in the composite material have an influence on the color filtering effect. Generally, it is believed that a composite material formed of a standard optical grade transparent plastic (for example, PC, PS, PMMA, PVDF, silicone, or PET) should contain at least 0.1 volume percent and more preferably about 1 to about 20 volume percent of $NdF_3$ or a comparable $Nd^{3+}$ ion source (as examples, Nd—F compounds and Nd—X—F compounds, including $MgF_2$ doped with Nd—F) to achieve a desired filtering effect. It is further believed that a suitable particle size for the particulate material is up to about 50 micrometers and preferably about 0.5 to about 5 micrometers. At these loadings and particles sizes, a composite material whose matrix material is one of the aforementioned standard optical grade transparent plastics will typically be readily moldable for a wide variety of shapes, with potential difficulties being encountered with smaller particle sizes and higher loadings.

While the invention has been described in terms of certain embodiments, it is apparent that other forms could be adopted by one skilled in the art. Therefore, the scope of the invention is to be limited only by the following claims.

What is claimed is:

1. A lightguide of a lighting unit,
   at least a portion of the lightguide being formed of a composite material comprising a polymeric matrix material and an inorganic particulate material that contributes a color filtering effect to visible light passing through the composite material,
   the inorganic particulate material comprising a neodymium compound containing $Nd^{3+}$ ions, wherein the neodymium compound is an Nd—F compound or an Nd—X—F compound where X is at least one element chosen from the group consisting of elements that form compounds with neodymium and elements other than neodymium that form compounds with fluorine;
   wherein the lightguide is configured to trap light received at an edge of the lightguide through total internal reflection, and redirect trapped light to be extracted from the lightguide at a surface thereof.

2. The lightguide according to claim 1, wherein the inorganic particulate material contributes the color filtering effect to visible light generated by an LED device.

3. The lightguide according to claim 1, wherein the inorganic particulate material predominantly filters wavelengths in the yellow light wavelength range.

4. The lightguide according to claim 1, wherein the neodymium compound is present as discrete particles of the inorganic particulate material.

5. The lightguide according to claim 1, wherein the neodymium compound is present as a dopant in discrete particles of the inorganic particulate material.

6. The optical component according to claim 1, wherein the neodymium compound is an Nd—X—F compound, and X is at least one element chosen from the group consisting of elements that form compounds with neodymium and elements other than neodymium that form compounds with fluorine.

7. The lightguide according to claim 1, wherein the polymeric matrix material is chosen from the group consisting of polycarbonate, polystyrene, polymethyl methacrylate, polyvinylidene fluoride, and silicone.

8. The lightguide according to claim 1, wherein the neodymium compound and the polymeric matrix material have refractive indices within 0.1 of each other in the visible light region.

9. The lightguide according to claim 1, wherein the inorganic particulate material and the polymeric matrix material have refractive indices within 0.1 of each other in the visible light region.

10. The lightguide according to claim 9, wherein the neodymium compound is present as discrete particles of the inorganic particulate material.

11. The lightguide according to claim 9, wherein the neodymium compound is present as a dopant in discrete particles of the inorganic particulate material, and the discrete particles are formed of a second material other than the neodymium compound.

12. The lightguide according to claim 11, wherein the discrete particles are formed of at least one material chosen from the group consisting of metal fluorides and metal oxides having refractive indices less than the polymeric matrix material.

* * * * *